Figure 3:
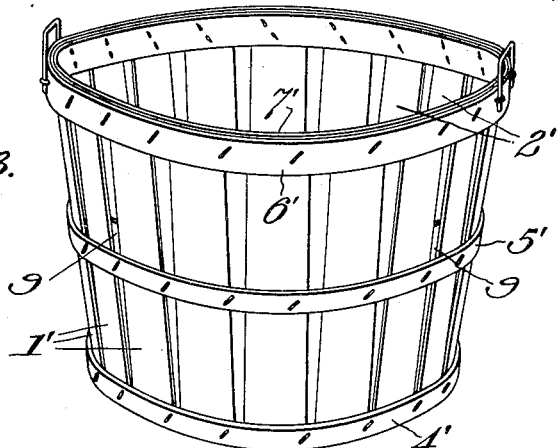

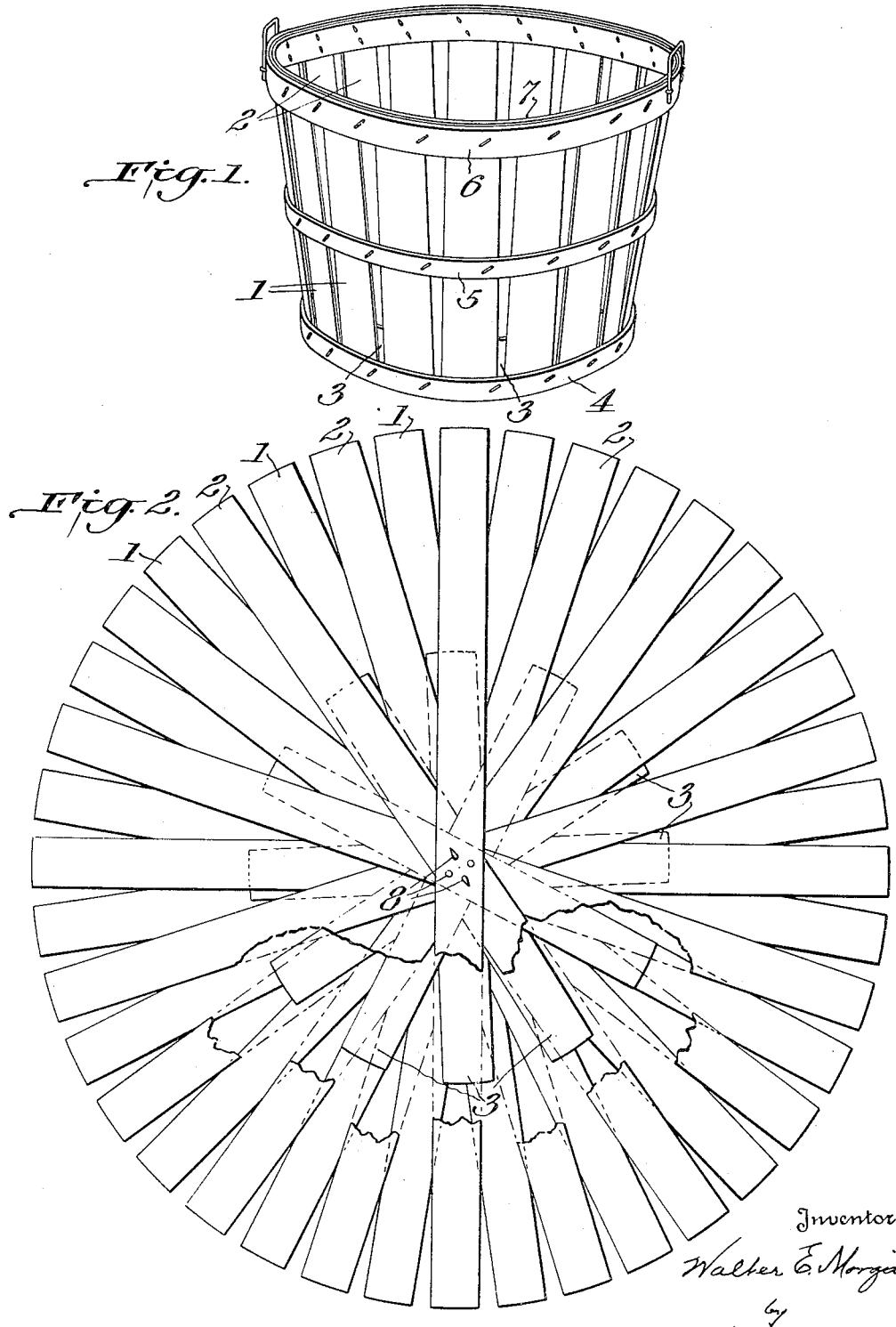

Nov. 7, 1933.  W. E. MORGAN  1,934,625
BASKET
Filed Dec. 13, 1932  2 Sheets-Sheet 2

Inventor
Walter E. Morgan
by
Attorney

Patented Nov. 7, 1933

1,934,625

UNITED STATES PATENT OFFICE 1,934,625

BASKET

Walter E. Morgan, Dayton, Tenn., assignor to Dayton Veneer and Lumber Mills, Dayton, Tenn., a corporation of Tennessee Application December 13, 1932
Serial No. 647,024

3 Claims. (Cl. 217—123)

This invention relates to baskets, particularly stave baskets, and embodies modifications of the invention disclosed in a co-pending application of Oliver M. James, for patent for Baskets, filed December 28, 1931, Serial No. 583,537, patented Jan. 10, 1933, No. 1,894,236.

In stave baskets, primarily such as are intended for what is known as export trade, it is desirable to so reinforce or strengthen the basket, particularly the bottom thereof, as to make it conform to export requirements.

Baskets of the type to which this invention especially relates, are customarily made of a plurality of stave members arranged in radiated superposed relation to form the basket web, and this web is pressed into basket shape by a machine customarily including a hollow receptacle having its interior of approximately the conformation of a finished basket, and a plunger cooperating with this receptacle and complementally shaped, which plunger is so operated as to force the web of stave members into the receptacle to shape it, after which the customary hoops are applied and stapled or otherwise affixed in place to complete the basket.

Such machines, as now customarily constructed, are adapted to accommodate between the interior surface of the receptacle and the exterior surface of the plunger a certain thickness of material as produced by the web of stave members from which the basket is formed. This is particularly true as regards those portions of the plunger and receptacle which lie adjacent to and produce the top of the basket, and hence any reinforcement applied to the basket during the process of its manufacture in the machine must be so designed as to take this characteristic of the machine into consideration.

I have found that the basket bottom may be satisfactorily reinforced, as may also its sides, by the inclusion in the basket web of a series of stave members of less length than those which normally form the bottom and sides, but which are of sufficient length to extend across the basket bottom and partway up the basket sides so as to be engaged beneath the bottom hoop of the basket or beneath the bottom hoop and the intermediate or center hoop thereof, without interfering with the operation of the machine during the process of forming the basket from the web.

A basket thus formed and including a reinforcing member of the kind mentioned has the characteristic of strength, particularly as regards its bottom and the lower portions of its sides, as required in baskets for export purposes. Moreover, a basket thus constructed, with a reinforcement included as a part of the web, has the advantage of capability of manufacture by well known existing machinery.

The invention comprises a basket formed from a basket web comprising a plurality of series of stave members, each series having the stave members of which it is formed arranged in radiated superposed relation, and the stave members of one of these series being shorter than those of the other series but of such length as to span the basket bottom and extend partway up the basket sides to an extent which will ensure their being engaged beneath at least the bottom hoop of the basket, the several series of stave members forming the web being so relatively arranged that their stave members break joints or span the spaces between the stave members of adjacent series to form a completely closed bottom and sides for the basket, and the series of short stave members providing a reinforcement for the bottom and a portion at least of the sides of the basket, all as will be explained hereinafter more fully and finally claimed.

Figure 4:
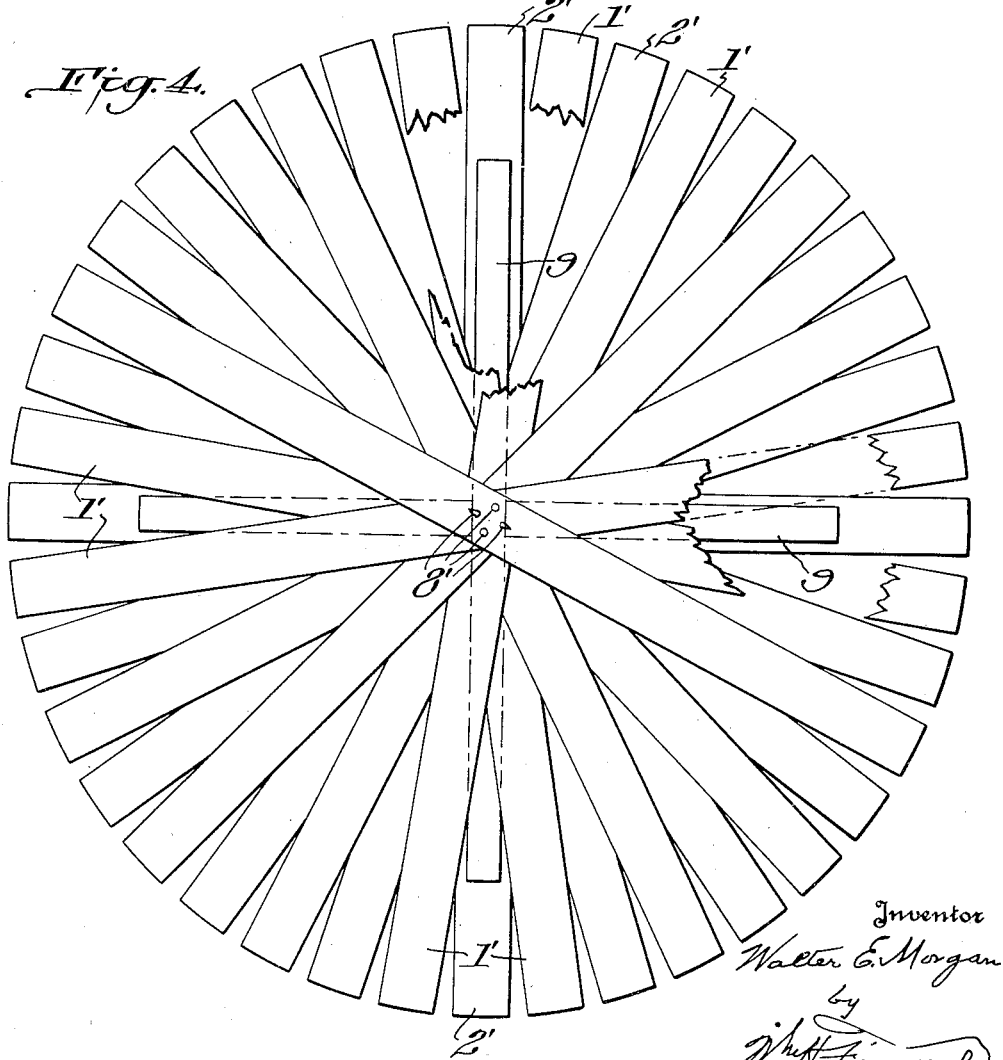

In the accompanying drawings illustrating the invention, in the several figures of which like parts are similarly designated, Figure 1 is a perspective view of a basket constructed in accordance with and embodying the novel features of the invention. Fig. 2 is a plan view of the web of stave members from which the basket of Fig. 1 is formed, portions being broken away. Fig. 3 is a perspective view of a basket embodying a modification of the invention, and Fig. 4 is a view similar to Fig. 2 but illustrating the web of stave members from which the basket of Fig. 3 is formed.

Referring to Figs. 1 and 2, it will be seen that the basket web comprises what may be termed three distinct and separate series of radiated superposed stave members. The first series, which may be termed the outer series, includes a plurality of stave members 1 arranged as described and appropriately spaced, and the second series, which may be termed the inner series, comprises a similar plurality of stave members 2 similarly arranged and spaced, and adapted when combined with the series of stave members 1 to substantially span the spaces between the stave members 1. Between the outer and inner series is arranged the reinforcing series which comprises a plurality of stave members 3 of such length, shorter than the stave members 1 and 2, as to span the basket bottom and extend partway up the sides thereof so as to be engaged beneath the bottom hoop 4, as illustrated in Fig. 1. If desired, however, these stave members 3 may be of such a length as to extend up the sides of the basket a distance sufficient to be engaged beneath the intermediate hoop 5, or they might even extend up the sides of the basket to such an extent as to be engaged beneath the top hoops 6 and 7, although if they were thus engaged beneath the top hoops 6 and 7, the basket forming machine would probably have to be so modified as to accommodate the added thickness incident to their extension to this point.

After the several series of stave members have been arranged as described, preferably with the intermediate or reinforcing series of stave members 3 so arranged as to span spaces or break joints between stave members of the other adjacent series, although this is not imperative, all of the stave members of all of the series of same are secured together in the arrangement desired, by means of nails 8 or other appropriate fastening means passed through them at their central point of intersection and appropriately clinched, and then the basket web is shaped to basket form by bending the staves thereof in the machine to define the bottom and sides, and the hoops are applied in the usual manner.

A basket thus constructed will have a bottom so reinforced by the reinforcing series of stave members 3 as to make it acceptable for export purposes, and its sides adjacent to the bottom will be so stiffened by the upward extension of the ends of the stave members of the reinforcing series as to prevent them from bulging or buckling. Moreover, where the staves are bent to define the bottom and sides of the basket, the reinforcing series of staves will reinforce this bend.

The basket illustrated in Figs. 3 and 4 is formed of a web of stave members comprising an inner and an outer series of stave members 1' and 2' substantially similar to the series of stave members 1 and 2 hereinbefore referred to, and similarly arranged relatively to each other, and the basket formed thereof, as illustrated in Fig. 3 has the bottom hoop 4' intermediate hoop 5' and top hoops 6' and 7' also similar to the corresponding parts of the basket of Fig. 1. However, the reinforcing member of the basket of Figs. 3 and 4 is shown as comprising two stave members 9 in cruciform arrangement and preferably of less width but greater thickness than the stave members 1' and 2'. These stave members 9 are of such length as to span the basket bottom and extend up its sides to a point slightly above the intermediate hoop 5', as indicated in Fig. 3 so that they will be engaged beneath this hoop, thus not only forming a reinforcement for and strengthening the basket bottom but reinforcing and strengthening the basket sides as well, so that buckling or bulging of the sides will be prevented.

Although only two stave members 9 are shown in Figs. 3 and 4, it will be understood that more could be used, if desired.

The plurality of stave members 1', 2' and 9, forming the several cooperating series of same, are secured together by means of the nails or other fastening devices 8' in a manner similar to that described with reference to Fig. 2.

It will be noted that the stave members 9 are preferably so arranged with respect to the stave members 1' and 2' that they will not appear upon the interior surface of the basket.

From the foregoing, it will be seen that baskets formed in accordance with my invention are so reinforced as regards the bottoms and sides thereof as to make them suitable for the purpose for which they are particularly designed, and stronger than stave baskets as customarily made, while at the same time the webs of stave members from which they are constructed have such characteristics that the baskets may be formed from these webs by machines of customary and accepted type.

Moreover, the added, interposed material, which forms the reinforcement, produces additional upset or inward bulge in the bottom of the basket, thus providing, in effect, an arched bottom which results in the load or weight of the basket contents being supported against the bottom hoop.

Various changes are contemplated as within the spirit of the invention and the scope of the following claims.

What I claim is:—

1. In a stave basket, a basket web comprising three series of staves, same being an outer series, an inner series, and a reinforcing series interposed between the outer and inner series, the staves of the reinforcing series being shorter than those of the outer and inner series, the staves of said web adapted to be so bent as to provide a basket having a bottom defined by the bend of the staves, and sides, said sides provided with a plurality of hoops including a top hoop adjacent to the top of the basket sides, and a bottom hoop adjacent to the bottom, the length of the staves of the reinforcing series being such that they span the basket bottom and extend over the bend and partway up the sides between the outer and inner series and are encompassed by the bottom hoop.

2. In a stave basket, a basket web comprising three distinct series of staves, same being an outer series, an inner series, and a reinforcing series interposed between the outer and inner series, the staves of the reinforcing series being shorter than those of the outer and inner series, the staves of said web adapted to be so bent as to provide a basket having a bottom defined by the bend of the staves, and sides, said sides provided with a top hoop, a bottom hoop, and a hoop intermediate said top and bottom hoops, the length of the staves of the reinforcing series being such that they span the basket bottom and extend over the bend and up the sides between the outer and inner series and terminate short of said intermediate hoop and are encompassed by said bottom hoop.

3. In a stave basket, a basket web comprising three distinct series of stave members, same being an outer series, an inner series, and a reinforcing series interposed between the outer and inner series, each series so arranged that the staves of same substantially span spaces between staves of the other series, the reinforcing series comprising two staves in cruciform arrangement, same being shorter than the staves of the outer and inner series, said web adapted to be so formed as to provide a basket having a bottom, and sides encompassed by a plurality of hoops including a top hoop adjacent to the top of the sides, and a bottom hoop adjacent to the bottom, the length of the staves of the reinforcing series being such that they span the basket bottom and extend up the sides between the outer and inner series and are encompassed by the bottom hoop.

WALTER E. MORGAN.